United States Patent [19]

Tomita et al.

[11] 3,798,559

[45] Mar. 19, 1974

[54] NOISE REDUCTION SYSTEM

[75] Inventors: Masao Tomita, Katano; Kiyoji Fujisawa, Hirakata, both of Japan

[73] Assignee: Matsushita Electric Industrial Co., Ltd., Osaka, Japan

[22] Filed: Apr. 17, 1972

[21] Appl. No.: 244,558

[30] Foreign Application Priority Data

Apr. 20, 1971 Japan .............................. 46-25892

Aug. 10, 1971 Japan .............................. 46-60737

[52] U.S. Cl. ............. 328/167, 307/235 R, 307/237, 328/150, 330/145, 330/149

[51] Int. Cl. ........................... H03f 1/26, H03g 1/04

[58] Field of Search ............ 307/235 R, 235 A, 233, 307/237, 246, 264; 328/150, 151, 165, 167, 168, 169, 171, 172; 330/29, 144, 145, 149

[56] References Cited

UNITED STATES PATENTS

| | | | |
|---|---|---|---|
| 3,714,588 | 1/1973 | Deboo et al. | 328/167 |
| 3,701,059 | 10/1972 | Nyswander | 328/167 X |
| 3,117,287 | 1/1964 | Damico | 330/29 X |
| 3,496,481 | 2/1970 | Torick et al. | 330/149 X |
| 3,497,815 | 2/1970 | Turner | 328/165 X |
| 3,548,334 | 12/1970 | Tomita et al. | 330/145 X |
| 3,560,768 | 2/1971 | Rimkus | 307/235 R X |
| 3,588,705 | 6/1971 | Loch et al. | 328/165 X |
| 3,596,192 | 7/1971 | Lutes | 328/165 |
| 3,638,037 | 1/1972 | McMurtrie | 307/235 A X |
| 3,716,726 | 2/1973 | Trimble | 328/171 X |

OTHER PUBLICATIONS

Abbiate et al., "Audio Signal Conditioning Circuit", IBM Tech. Discl. Bull., Vol. 12, No. 5, pp. 661, 10/1969.

*Primary Examiner*—John S. Heyman

*Assistant Examiner*—L. N. Anagnos

*Attorney, Agent, or Firm*—Wenderoth, Lind & Ponack

[57] ABSTRACT

A noise reduction system which has a switching circuit, a charge-and-discharge circuit and a variable gain amplifier. When the input signal is lower than a predetermined threshold level, the charge-and-discharge circuit is changed to charging operation by the switching circuit and a control voltage is applied to the variable resistance means, whereby the resistance thereof is decreased and the input signal is attenuated. When the input signal exceeds the predetermined threshold level, the charge-and-discharge circuit is changed to discharging operation and the control voltage becomes zero, so that the input signal is not attenuated since the variable resistance means has a small resistance. Accordingly, the input noises can be removed during a pause in the input signal.

11 Claims, 13 Drawing Figures

NOISE REDUCTION SYSTEM

FIELD OF THE INVENTION

This invention relates to a noise reduction system, and more particularly relates to a noise reduction system for reducing amplifier noise, and tape noise of a tape recorder and the like operating in the audio frequency range.

DESCRIPTION OF THE PRIOR ART

In general, an output signal derived from amplifiers contain various noises such as amplifier noise, recording medium noise, transmission noise and other undesired signals. Therefore, the signal to noise ratio of the output signal of amplifiers is limited to a certain value and the quality of the output signal is inevitably degraded.

Up to the present, several methods for reducing noise have been developed. These system for reducing such noises can be classified into two basic types. In a signal recording and reproducing system, there are two types, i.e. a type for reducing the noises through both the recording process and the reproducing process, and a type for reducing the noises only through the reproducing process.

As an example of the first type, there is a system in which the signal to be recorded is modified so as to emphasize the low level component thereof and the reproduced signal is modified so as to have a complementary characteristic to the emphasized characteristic. However, such a noise reduction system has several disadvantages. Because the linearity of the output signal depends on the degree of coincidence of the complementary characteristics, it is necessary to adjust the characteristic precisely. Since it is difficult to adjust the complementary characteristics precisely, a harmonic distortion is apt to appear in the output signal. Moreover, the circuit arrangement becomes complex because modifications of the circuit are necessary for both the recording process and the reproducing process.

As an example of the second type, there is another system by which the high frequency response of the amplifier is varied automatically in accordance with the input signal level. However, in this system high fidelity is not acheived because the high frequency response is limited at small signal level. There is still another system by which the reproduced signal is divided into a plurality of bands by several band pass filters and the band for the small amplitude region of the signal is cut out, and after that the signals of the remaining bands are recombined. However, this system is not in pratical use because of the difficulty of reducing the harmonic distortion. There is yet another system which removes the noises during the absence of a signal. However, this system is not sufficiently practical because it causes the fractuation of the signal when the signal is very weak and further the noises can not be reduced naturally.

BRIEF SUMMARY OF THE INVENTION

Therefore, an object of the present invention is to provide an improved noise reduction system which removes noises during the absence of signals.

Another object of the invention is to provide a noise reduction system which does not cause degeneration of signals due to distortion and frequency response alteration.

Still another object of the invention is to provide a noise reduction system in which the degree of noise attenuation is changed according to the time from the beginning of a pause of the signal.

A further object of the invention is to provide a noise reduction system in which the cut-off frequency of the filters used in the system is changed according to the time from the beginning of the pause of the signal.

A still further object of the invention is to provide a noise reduction system which operates independently of the signal level before the pause of the signal.

A further object of the invention is to provide a noise reduction system in which fractuation of the signal is not caused even when the signal is very weak.

It is a still further object of the invention to provide a noise reduction system in which the threshold level is changed according to the amplifier gain and a rectified voltage.

The above objects of the invention will be apparent from a consideration of the following detailed description with reference to the accompanied drawings in which.

DETAILED DESCRIPTION OF THE EMBODIMENT

A noise reduction system according to the present invention comprises an input terminal, an output terminal, a switching means which comprises a constant voltage source and a switching circuit and which is connected to said input terminal, a charge-and-discharge means which comprises a capacitor, at least one resistor and at least one diode and which is coupled to said switching means, the charging operation and discharging operation of said charge-and-discharge means being changed by said switching means, a variable gain means which comprises a resistor, a capacitor and a variable resistance means and which is coupled between said input terminal and said output terminal and is also coupled to said charge-and-discharge means, and a series connected amplifier means and rectifier means coupled between said input terminal of said system and said switching means, whereby the gain of said variable gain means is controlled according to the output signal from said charge-and-discharge means.

Figure 1:
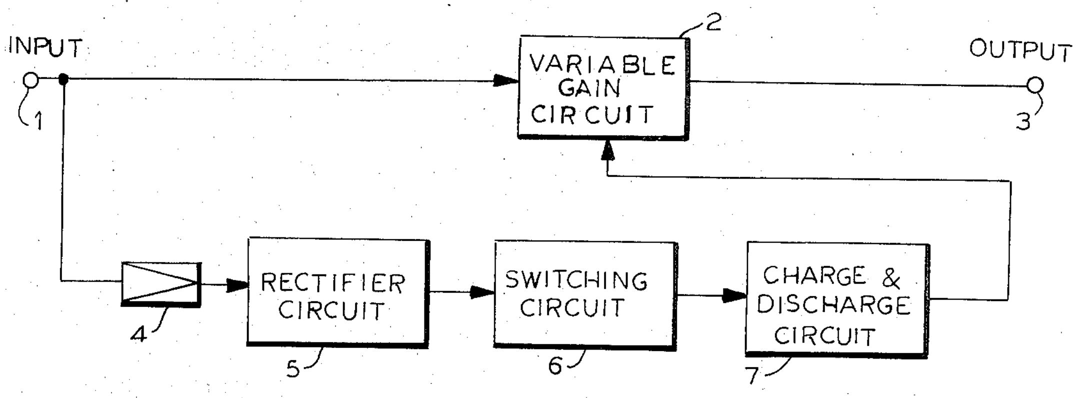
FIG. 1 is s block diagram of a noise reduction system according to the invention.

Now, referring to FIG. 1, an input signal applied to an input terminal 1 is applied to a variable gain circuit 2, and the signal which is controlled by the variable gain circuit 2 is supplied to an output terminal 3. The variable gain circuit 2 is formed by a transistor, a field effect transistor or diodes. On the other hand, a part of the input signal is also supplied to a series circuit comprised of an amplifier circuit 4, a rectifier circuit 5, a switching circuit 6 and a charge-and-discharge circuit 7, and the charge-and-discharge circuit 7 is coupled to the variable gain circuit 2. The gain of the variable gain circuit 2 is controlled according to the control voltage supplied from the charge-and-discharge circuit 7. The amplifier circuit 4 comprises generally transistors and capacitors, and it amplifies the input signal to a moderate amplitude. The rectifier circuit 5 comprises diodes, capacitors and resistors, and it provides a D.C. voltage in responsive to the output signal of the amplifier 4. The switching circuit 6 comprises transistors, diodes and resistors and its resistance is very small. According to the operation of the switching circuit 6, the D.C. voltage from a constant voltage source in the switching circuit 6 is applied to the charge-and-discharge circuit 7 or not applied thereto. The charge-and-discharge circuit 7 comprises a capacitor and a parallel circuit comprised of a diode and a resistor. When the operation is set for charging by the switching circuit 6, the charge-and-discharge circuit 7 charges the capacitor with the control voltage through the resistor, and the charge on the capacitor is discharged through the diode when the charge-and-discharge circuit 7 is changed to the discharging operation by the switching circuit 6.

Figure 2:
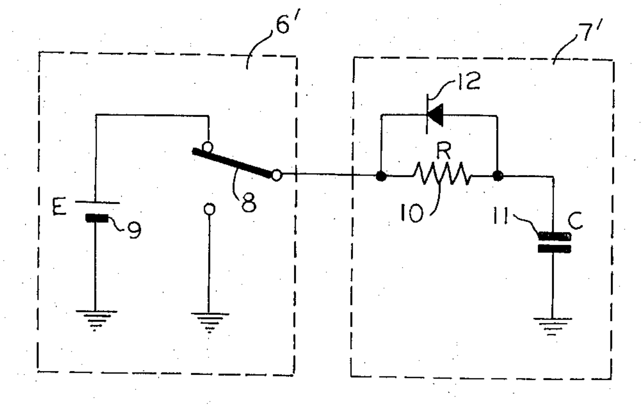
FIG. 2 is an equivalent circuit of the switching means and a circuit of the charge-and-discharge means of the block diagram shown in FIG. 1.

One example of a charge-and-discharge circuit 7 is shown in FIG. 2 together with the equivalent circuit of the switching circuit 6. In FIG. 2, the block enclosed by the dotted line 6′ is the equivalent circuit of the switching circuit 6, and the block 7′ is an example of the charge-and-discharge circuit 7. When a switch 8 is connected to a constant voltage source 9, such as a battery, a diode 12 is biased reversely and a capacitor 11 is charged by the voltage source 9 through a resistor 10. The voltage charge on the capacitor 11 ($e_c$) is expressed by the following equation (1);

$$e_c = E\ (1-\epsilon^{-(1/CR)\ t}\ ) \qquad (1)$$

in which E is the voltage of the D.C. source 9, R is the resistance of the resistor 10 and C is the capacitance of the capacitor 11.

Figure 3:
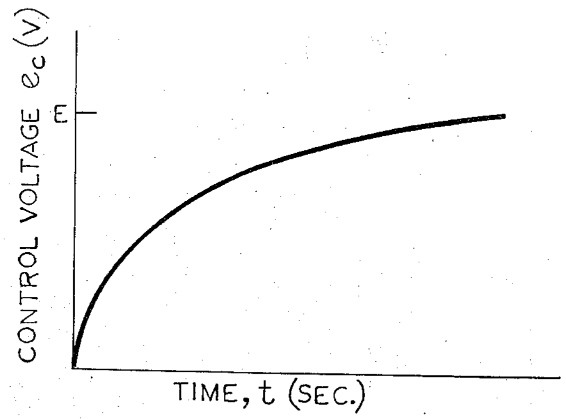
FIG. 3 is a graph showing the charging characteristic of the charge-and-discharge means shown in FIG. 2.

From the equation (1) it will be understood that the voltage charge $e_c$ varies exponentialy with respect to the time t after the switch 8 is connected to the battery 9 as shown in FIG. 3. When a series circuit of a resistor and a diode connected is in parallel with the resistor 10 in FIG. 2 and the resistance of that added resistor is smaller than that of the resistor 10, the charging characteristic can be set so that the capacitor 11 is charged quickly to a certain voltage and after that it is charged slowly. In many case such a charging characteristic provides a more comfortable effect for listening. When the switching circuit 8 is grounded, the diode 12 is biased forwardly by the charge on the capacitor 11, and the diode 12 presents a very small resistance. Therefore, the capacitor 11 is discharged very rapidly through the resistance of the diode 12. Here, it is possible to provide various charging characteristics by varying the values of the resistance R, the capacitance C and the voltage E.

The input signal supplied to the input terminal is amplified by the amplifier 4 and rectified by the rectifier circuit 5. When the rectified voltage of the rectifier 5 is higher than a predetermined voltage, the constant voltage from the constant voltage source in the switching circuit 6 is applied to the charge-and-discharge circuit 7 from the switching circuit 6, so that the control voltage of the charge-and-discharge circuit 7 increases gradually as shown in FIG. 3. The degree of attenuation of the variable gain circuit 2 increases in accordance with increase of the control voltage from the charge-and-discharge circuit 7. Therefore, the degree of attenuation increases slowly during the time after the input signal becomes smaller than the predetermined threshold level. That is, the degree of attenuation varies in the same way as the control voltage shown in FIG. 3.

When the input signal is larger than the predetermined threshold level, the D.C. voltage from the rectifier circuit 5 becomes large enough, to switch the switching circuit 6 so as to ground the charge-and-discharge circuit 7. Therefore, the control voltage of the charge-and-discharge circuit 7 becomes zero, and the variable gain circuit 2 provides the input signal to the output terminal 3 without attenuation. It is possible to set freely the threshold level, at which the switching circuit 6 is operated by varying the gain of the amplifier 4 and the performance of the rectifier 5. Therefore, the threshold level can be set so as to provide attenuation by the variable gain circuit 2 only when the input signal is at a low level which is only a noise. It is convenient to use a potentiometer for the amplifier 4 or the rectifier 5 for this purpose.

The rise time from attenuating condition where the input signal is only noise to the condition where the attenuation is stopped on arrival of a large input signal is determined by the discharging time of the charge-and-discharge circuit 7. This rise time is sufficiently short since the charge is discharged very rapidly through the resistance of the forwardly biased diode. Since the amount of noise attenuation is determined by the degree of attenuation by the variable gain circuit 2, it can be freely set by varying the control voltage $e_c$ and the characteristic of the variable gain circuit 2.

Figure 4:
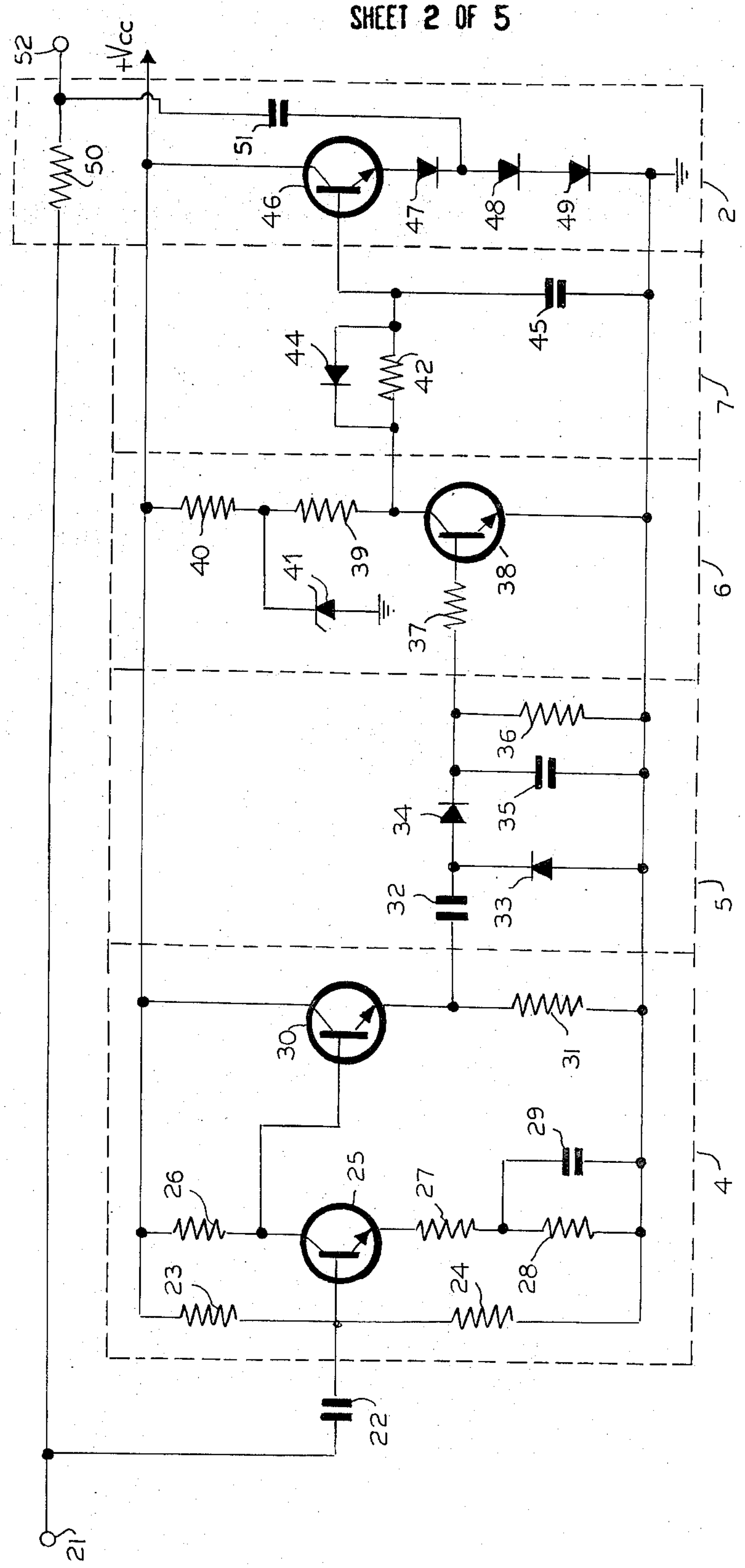
FIG. 4 is a circuit diagram of the noise reduction system according to the block diagram shown in FIG. 1.

FIG. 4 shows a practical circuit configuration embodying the invention. In FIG. 4, an input signal from an input terminal 21 is supplied through a coupling capacitor 22 to an amplifier which consists of a transistor 25, base bias resistors 23 and 24, a collector resistor 26, emitter resistors 27 and 28 and a bypass capacitor 29. The amplified signal is supplied to an emitter of a transistor 30. Here, the transistor 30 and a resistor 31 form an emitter follower circuit. This amplifier circuit comprising the transistors 25 and 30 corresponds to the amplifier circuit 4 shown in FIG. 1, and the gain thereof is set by providing a resistor 27 which has an appropriate resistance value.

The signal appearing at the emitter of the transistor 30 is rectified by a voltage doubler rectifier which consists of capacitors 32 and 35, diodes 33 and 34 and a resistor 36. This circuit corresponds to the rectifier 5 shown in FIG. 1. The charging time of this rectifier circuit is determined by the resistance of the forwardly biased diode 34 and the capacitance of the capacitor 35, if the output impedance of said emitter follower circuit is very small. The discharging time is determined by the capacitance of the capacitor 35 and the resistance of the resistor 36. Therefore, it is easy to set the charging and discharging time so that it is sufficiently short.

The rectified voltage appeared at the capacitor 35 provides a base current for a switching transistor 38 through a resistor 37. The emitter of the transistor 38 is grounded and the collector thereof is connected to a junction point of a resistor 40 and a Zener diode 41 through a collector resistor 39. When the rectified voltage appearing at the capacitor 35 is large, the base current flowing into the transistor 38 is also large. Therefore, the transistor 38 is driven into the saturation range, and the collector voltage approaches the ground voltage. When the rectified voltage is small, the base current of the transistor 38 is small. Accordingly, the transistor 38 is in a cut off range, and the collector voltage thereof is determined by the Zener diode 41. The circuit comprising the transistor 38, zener diode 41 and the resistors 39 and 40 corresponds to the switching circuit 6 shown in FIG. 1.

The collector of the transistor 38 is connected to the charge-and-discharge circuit 7 which has been described hereinbefore in connection with FIG. 2. The charge-and-discharge circuit comprises a resistor 42, diode 44 and a capacitor 45. The control voltage appearing at the capacitor 45 controls the gain of the variable gain circuit. The variable gain circuit comprises a resistor 50 which connected between the input terminal 21 and an output terminal 52, a transistor 46, diodes 47, 48 and 49 and a capacitor 51. This circuit is the variable attenuator which has the resistor 50 as a series element and the resistance of the diodes 47, 48 and 49 and the transistor 46 as a parallel element. The control voltage appearing at the capacitor 45 is supplied to a base of the transistor 46, and a base current flows thereinto. The transistor 46 amplifies the base current and provides an emitter current through the diodes 47, 48 and 49. The resistance of these diodes varies in accordance with the emitter current. That is, the resistance of these diodes varies in accordance with the control voltage. Accordingly, the behavior of the attenuation in this variable attenuator is very similar to that of the control voltage shown in FIG. 3.

In this circuit configuration, the switching circuit 6 comprising the transistor 38 is switched to one state from its other state according to the input signal level. The input signal level at which the switching circuit 6 is switched, that is, the threshold level is determined as follows. The voltage between the two ends of the capacitor 35 controls the operating range of the switching transistor 38, because the operating range thereof is determined by the base current, and the base current is determined by the voltage between the ends of the capacitor 35.

An input signal applied to the input terminal 21 is amplified by the amplifier 4 having a constant voltage gain, and the amplified signal appearing at the emitter of the transistor 30 is rectified by the voltage doubler rectifier 5. Thus, the rectified voltage at the capacitor 35 is proportional to the input signal level. Therefore, the switching transistor 38 is driven into its saturation range by input signals which are above the threshold level, and the transistor 38 is in its cut off area for input signals which are below the threshold level. From the above description, it is evident that the threshold level can be adjusted by adjusting the constant voltage gain of the amplifier 4.

Now suppose that the input signal applied to the input terminal 21 is above the threshold level. The signal amplitude appearing at the emitter of the transistor 30 is sufficiently large so that the rectified voltage appearing at the capacitor 35 causes the flow of sufficient base current of the transistor 38 for driving it into the saturation range through the resistor 37. Then, the collector voltage of the switching transistor 38 approaches the ground voltage because the saturation resistance of it is very small. Therefore, the charged voltage at the capacitor 45 of the charge-and-discharge means 7 is discharged very rapidly through the diode 44 and the saturation resistance of switching transistor 38. The emitter current of the transistor 46 flowing through the diodes 47, 48 and 49 is almost zero because the control voltage appearing at the capacitor 45 is almost zero. Since the resistance of the variable resistance means consisting of the transistor 46 and diodes 47, 48 and 49 provides a very high resistance, the variable gain circuit 2 consisting of the resistor 50, capacitor 51 and the variable resistance means hardly gives any attenuation. Accordingly, the input signal applied to the input terminal 21 appears at the output terminal 52 without an attenuation. In the case when the input signal is lower than the threshold level, the signal amplitude appearing at the emitter of the transistor 30 is not sufficiently large. Consequently, the rectified voltage appearing at the capacitor 35 cannot cause the flow of sufficient base current to the switching transistor 38 for operating it in the saturation range. Therefore, the switching transistor 38 is in the cut off area, and the collector voltage thereof approaches the zener voltage of the Zener diode 41. Then, the capacitor 45 of the charge-and-discharge means 7 is charged through the resistor 42 from the collector voltage of transistor 38. The control voltage appearing at the capacitor 45 varies exponentially as shown in FIG. 3, and the emitter current of the transistor 46 flows in response to the control voltage through the diodes 47, 48 and 49. The resistance of the variable resistance means decreases in accordance with the curve as shown in FIG. 3 so as to achieve the attenuation of variable gain circuit 2. Accordingly, when the input signal is lower than the threshold level an attenuated output signal appears at the output terminal 52.

According to the embodiment shown in FIG. 4, when the input signal becomes only noise, the degree of noise attenuation increases with a slow response to the control voltage, and finally the degree of noise attenuation becomes large. Therefore, the noise is reduced naturally for hearing and so the attenuation is very comfortable, for example when the program source such as music or speech no longer supplies a signal. Moreover, in the case when the program signal includes a very weak signal, a fluctuation of the signal is not caused because the degree of noise attenuation does not reach the maximum value quickly. The rise time from the attenuation condition to the no-attenuation condition when a strong signal occurs is determined by the charging time of the capacitor 35 and the discharging time of the capacitor 45, and both of these times can be set as short as a few milli-second as described above. Therefore, there is no degeneration of the output signal due to distortion.

Figure 5:
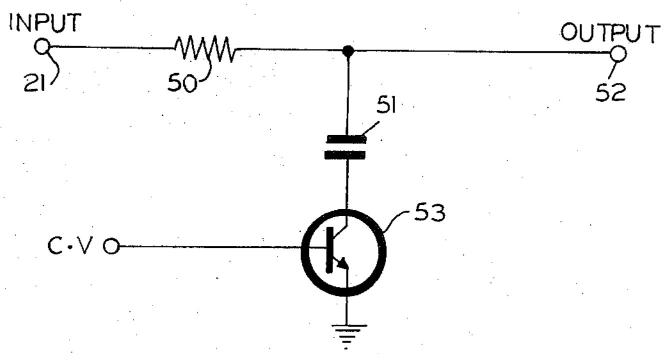
FIGS. 5, 6 and 7 are circuit diagrams of a variable gain means of the block diagram shown in FIG. 1, respectively.
Figure 6:
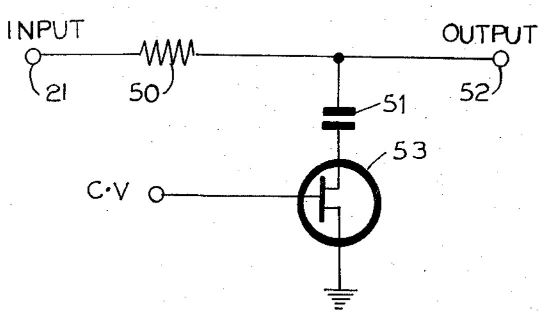
Figure 7:
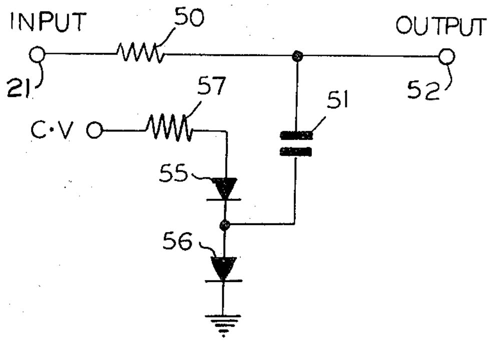

Alternative forms of the variable gain circuit 2 are shown in FIGS. 5, 6 and 7. Referring to FIG. 5, the variable gain circuit consists of a resistor 50, a capacitor 51 and a transistor 53. The control voltage designated by C.V. in the drawing is applied to a base of the transistor 53, and thereby the saturation resistance between the collector and the emitter of the transistor 53 is changed.

Referring to FIG. 6, a field effect transistor 54 is used for the variable resistance means, and the control voltage C.V. is supplied to a gate of the field effect transistor 54. The resistance between the drain and the source thereof is varied in accordance with the control voltage.

Referring to FIG. 7, two diodes 55 and 56 are used for the variable resistance means, and the control voltage C.V. is supplied to the anode of the diode 55 through a resistor 57. A resistance of these diodes 55 and 56 is controlled by a current flowing through the diodes 55 and 56.

Figure 8:
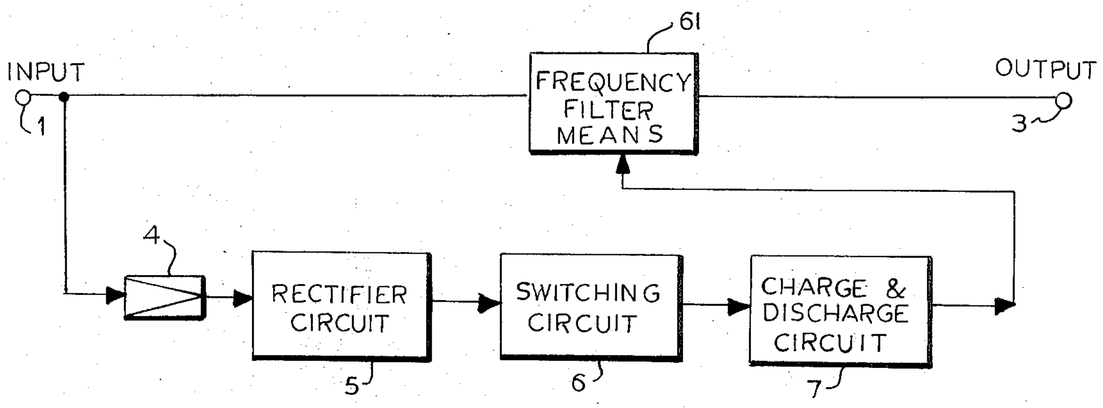
FIG. 8 is another block diagram of the noise reduction system according to the invention.

FIG. 8 is a block diagram of another embodiment of the invention. In FIG. 8, the blocks having the same reference numbers as those in FIG. 1 represent the same means. The block diagram circuit of FIG. 8 is similar to that of FIG. 1 except that the variable gain means 2 in FIG. 1 is replaced by a frequency filter means 61. In FIG. 8, an input signal from the input terminal 1 is supplied to the filter means 61 (low pass filter) and the signal, the cut off frequency of which is controlled by the filter 61, is supplied to the output terminal 3. On the other hand, a part of the input signal is supplied to the series circuit consisting of the amplifier circuit 4, rectifier circuit 5, switching circuit 6 and charge-and-discharge circuit 7. The charge-and-discharge circuit is coupled to the low pass filter so as to control the cut off frequency thereof. The cut off frequency of the low pass filter 61 is changed according to the control voltage supplied from the charge-and-discharge circuit 7. The operations of the amplifier 4, rectifier 5, switching circuit 6 and charge-and-discharge, circuit 7 are the same as the same elements of FIG. 1 described hereinbefore, and so the description thereof is omitted here. The low pass filter comprises generally a transistor, a field effect transistor or diodes.

Figure 9:
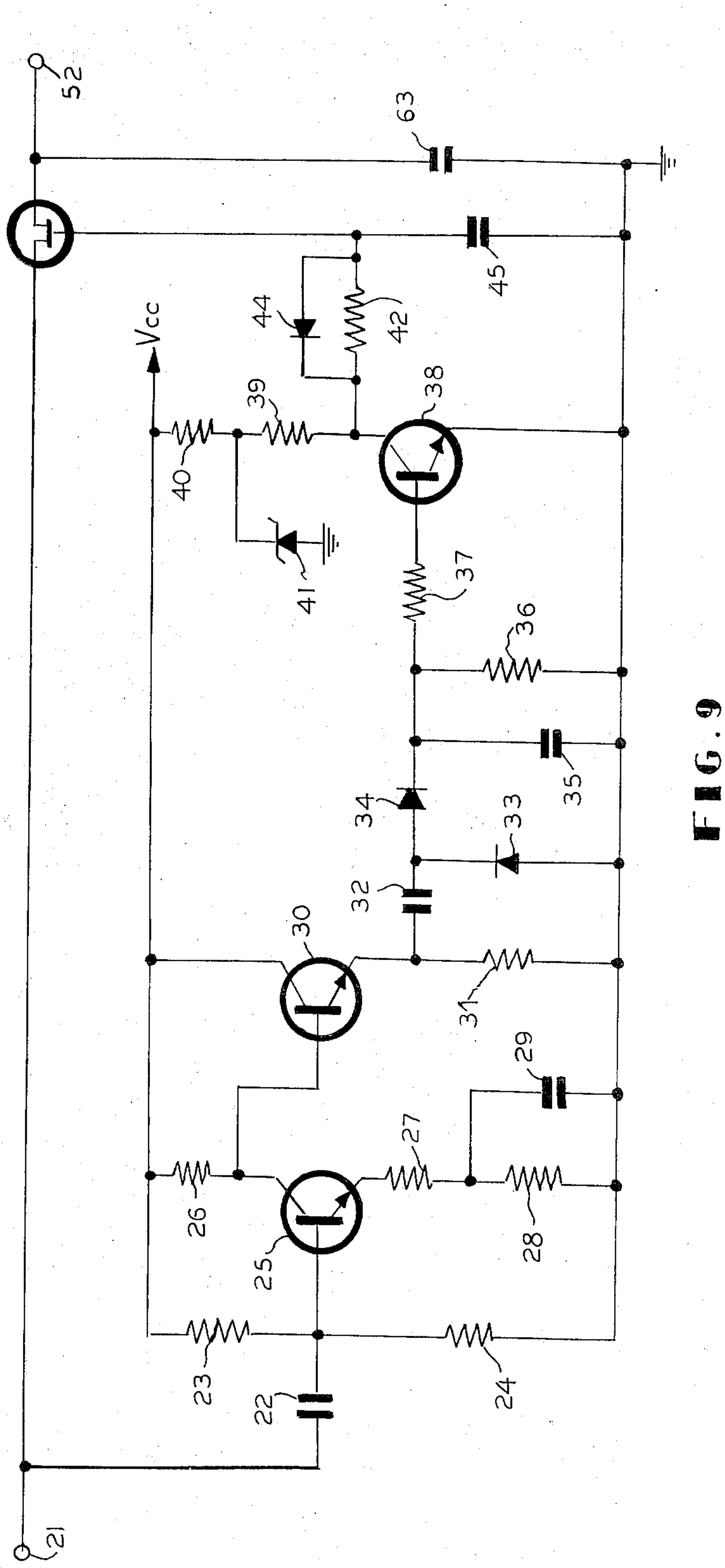
FIG. 9 is a circuit diagram of the noise reduction system according to the block diagram shown in FIG. 8.

FIG. 9 is a circuit diagram of a practical embodiment of the block diagram shown in FIG. 8, in which the same elements as those in FIG. 4 are designated by the same reference numeral. The low pass filter consists of a field effect transistor 62 connected between the inout terminal 21 and the output terminal 52 and a capacitor 63. The cut off frequency fc of this low pass filter is determined by the following equation (2);

$$fc = 1/2\pi\ C_F \cdot R_F \qquad (2)$$

in which $R_F$ is a resistance between the drain and a source of the field effect transistor and $C_F$ is the capacitance of the capacitor 63. The resistance $R_F$ varies widely in accordance with the voltage applied to the gate of the field effect transistor 62.

Figure 10:
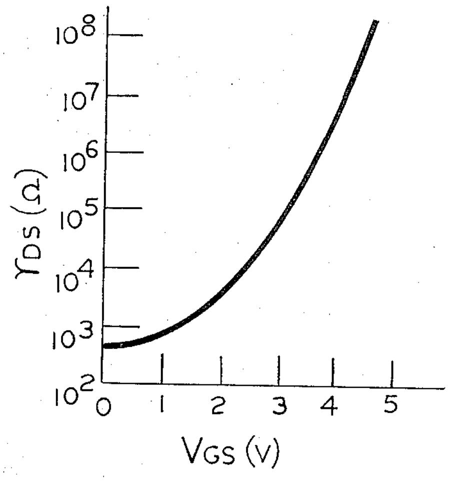
FIG. 10 is a graph showing the characteristic of a field effect transistor used in the circuit shown in FIG. 9.
Figure 11:
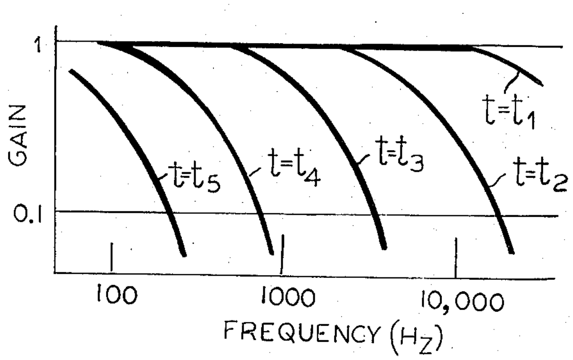
FIGS. 11, 12 and 13 are graphs showing characteristics of the noise reduction system according to the block diagram shown in FIG. 8, respectively.

For example, the characteristic of the gate voltage versus the resistance between the drain and the source of a P channel field effect transistor is shown in FIG. 10. Accordingly, the cut off frequency of the low pass filter is varied according to the gate voltage of the field effect transistor 62. When the input signal becomes lower than the predetermined threshold level, the control voltage appearing at the capacitor 45 increases as shown in FIG. 3. Therefore, the resistance between the drain and the source of the field effect transistor 62 becomes larger slowly and the cut off frequency of the low pass filter shifts toward the low frequency. That is, the band in which the noises are reduced expands slowly with time from high frequency components to low frequency components, as shown in FIG. 11 in which time passes from $t_1$ to $t_2$, $t_3$, $t_4$ and $t_5$. Accordingly, the noises during a pause in the signal are reduced very naturally for hearing. When the input signal is higher than the threshold level, the signal is not attenuated since the cut off frequency of the low pass filter is very high. That is, there is no degeneration of the signal due to limit of the frequency characteristic.

Figure 12:
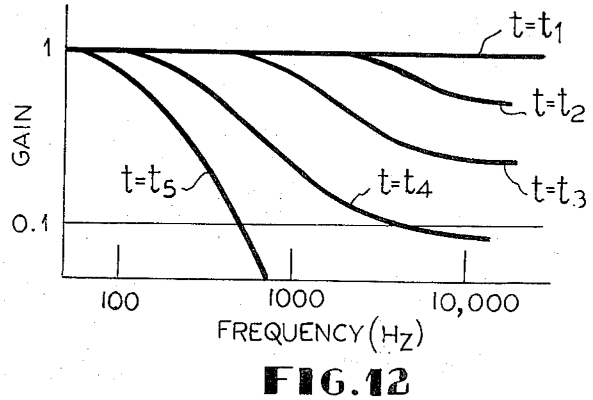

The reduction of the noises is improved for hearing by connecting a resistor between the capacitor 63 and ground. In this configulation, the degree of noise reduction increases as the cut off frequency of the low pass filter shifts toward the low frequency, with expansion of the band in which the noises are reduced, as shown in FIG. 12. This produces a more comfortable noise reduction for hearing.

Figure 13:
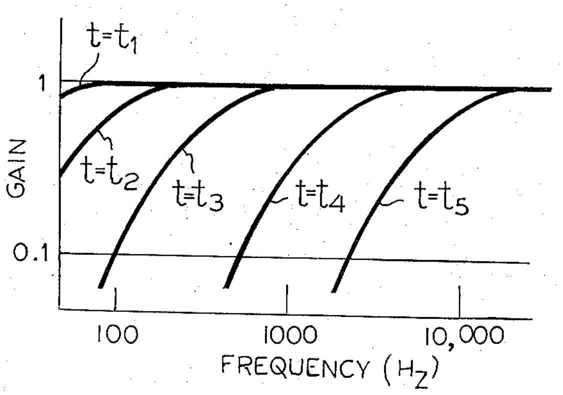

Moreover, if it is desired that the band in which the noises are reduced vary from the low frequency components toward the high frequency components, this can be accomplished easily by replacing the low pass filter 61 shown in FIG. 8 with a high pass filter. Noise reduction in this case is shown in FIG. 13. For the variable resistance means which forms the low pass filter or high pass filter, it is desirable to use a transistor or a diode.

There is described herein a preferred embodiment of the invention, and it is apparent that various modifications may be made without departing from the spirit and scope of the invention which is defined by the following claims.

What we claim is:

1. A noise reduction system comprising:

an input terminal;

an output terminal;

variable gain means comprising a resistor, a capacitor and a variable resistance means operatively coupled together, said variable gain means connected between said input terminal and said output terminal;

and a control means coupled at one end thereof to said input terminal and coupled at another end thereof to said variable resistance means, said control means comprising a series connection of an amplifier means, a rectifier means, a switching means comprising a constant voltage source and a switching circuit which is switched in accordance with a signal generated by said rectifier means, and a charge-and-discharge means comprising a capacitor, at least one resistor and at least one diode operatively coupled together and having different time constants for the charging operation and discharging operation thereof respectively, and being switched from one state to the other state by said switching means, whereby the gain of said variable gain means is controlled in accordance with the output signal of said from said charge-and-discharge means.

2. A noise reduction system as claimed in claim 1 wherein said diode and resistor of said charge-and-discharge means are connected in parallel and said capacitor of said charge and discharge mean is grounded at one end and connected at the other end thereof to the parallel connection of said diode and said resistor.

3. A noise reduction system as claimed in claim 2 wherein said resistor of said variable gain means is coupled between said input and output terminals of said system, and said variable resistance means is connected at one end to said output terminal through said capacitor of said variable gain means and grounded at the other end thereof.

4. A noise reduction system as claimed in claim 3 wherein said variable resistance means is a transistor, the collector of which is connected to said output terminal of said system through said capacitor of said variable gain means, the emitter of which is grounded, and the base of which is connected to said charge-and-discharge means.

5. A noise reduction system as claimed in claim 3 wherein said variable resistance means is a field effect transistor, the drain of which is connected to said output terminal of said system through said capacitor of said variable gain means, the source of which is grounded, and the gate of which is connected to said charge-and-discharge means.

6. A noise reduction system as claimed in claim 3 wherein said variable resistance means comprises a series circuit comprised of two diodes and a resistor, the junction point of said series connected two diodes being connected to said output terminal of said system through said capacitor of said variable gain means, and said series circuit being connected at one end to said charge-and-discharge means through said resistor and being grounded at the other end.

7. A noise reduction system as claimed in claim 3, wherein said variable resistance means comprises a transistor and a series connection of three diodes, the emitter of said transistor being grounded through said series connection of three diodes, the base of said transistor being connected to said charge-and-discharge means and the collector of said transistor being connected to a D.C. source, and the junction point of a first diode and a second diode in said series connection of three diodes being connected to said output terminal of the noise reduction system through said capacitor of said variable gain means.

8. A noise reduction system as claimed in claim 1, wherein said switching means comprises a Zener diode, a resistor and a transistor, said Zener diode being connected to the collector of said transistor through said resistor at one end thereof and being grounded at the other end thereof, the operation of said transistor being changed between a saturation state and a cut-off state according to the output signal from said rectifier means.

9. A noise reduction system comprising an input terminal, an output terminal, a frequency filter means which comprises a capacitor and a variable resistance means coupled between said input terminal and said output terminal, a switching means which comprises a constant voltage source and a switching circuit, a charge-and-discharge means which comprises a capacitor, at least one resistor and at least one diode and which is coupled to said switching means and has the charging operation and discharging operation changed by said switching means in accordance with an input signal level, said charge-and-discharge means being coupled to said frequency filter, and a series circuit of an amplifier means and a rectifier means coupled between said input terminal and said switching means, whereby the cut-off frequency of said frequency filter means is controlled according to the output signal from said charge-and-discharge means.

10. A noise reduction system as claimed in claim 9 wherein said frequency filter means is a low pass filter having said variable resistance means coupled between said input terminal and said output terminal, and having said capacitor coupled between said output terminal and ground.

11. A noise reduction system as claimed in claim 10, wherein said low pass filter further comprises a resistor which is connected in series with said capacitor.

* * * * *